US008511861B2

(12) United States Patent
Cheng et al.

(10) Patent No.: US 8,511,861 B2
(45) Date of Patent: Aug. 20, 2013

(54) TABLE LAMP AND ROTARY JOINT THEREOF

(75) Inventors: Gang Cheng, Shenzhen (CN); Meng-Hua He, Shenzhen (CN); Jia-Ning Huang, Shenzhen (CN); Yu-Tao Chen, Taipei Hsien (TW); Chun-Che Yen, Taipei Hsien (TW); Te-Sheng Jan, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 664 days.

(21) Appl. No.: 12/729,179

(22) Filed: Mar. 22, 2010

(65) Prior Publication Data

US 2011/0051429 A1 Mar. 3, 2011

(30) Foreign Application Priority Data

Aug. 27, 2009 (CN) .......................... 2009 1 0306196

(51) Int. Cl.

| | |
|---|---|
| ***F21V 21/26*** | (2006.01) |
| ***F21V 21/30*** | (2006.01) |
| ***F21V 19/00*** | (2006.01) |
| ***F21S 8/00*** | (2006.01) |
| ***F16C 11/06*** | (2006.01) |

(52) U.S. Cl.
USPC ........... 362/288; 362/269; 362/287; 362/427; 403/150; 403/151; 403/152; 403/157; 403/161

(58) Field of Classification Search
USPC ................. 362/269–275, 287–288, 419, 421, 362/427; 403/150–152, 157, 161
See application file for complete search history.

(56) References Cited

U.S. PATENT DOCUMENTS

| | | | | | |
|---|---|---|---|---|---|
| 1,649,951 | A | * | 11/1927 | English | 403/96 |
| 1,961,789 | A | * | 6/1934 | Roth | 403/151 |
| 2,942,902 | A | * | 6/1960 | Rowland | 403/134 |
| 3,249,706 | A | * | 5/1966 | Amos | 200/17 R |
| 3,323,654 | A | * | 6/1967 | Lee | 210/404 |
| 3,381,104 | A | * | 4/1968 | Abell et al. | 200/332.2 |
| 3,461,528 | A | * | 8/1969 | Pieper et al. | 29/898.048 |
| 3,891,247 | A | * | 6/1975 | Smith | 285/110 |
| 4,160,285 | A | * | 7/1979 | Shibla | 362/145 |
| 4,881,843 | A | * | 11/1989 | Randleman | 403/92 |
| 4,928,217 | A | * | 5/1990 | Laske | 362/427 |

(Continued)

FOREIGN PATENT DOCUMENTS

| | | | |
|---|---|---|---|
| CN | 1087708 | A | 6/1994 |
| CN | 2314236 | Y | 4/1999 |
| TW | 514705 | B | 5/2002 |

*Primary Examiner* — David J Makiya
*Assistant Examiner* — Bryon T Gyllstrom
(74) *Attorney, Agent, or Firm* — Altis Law Group, Inc.

(57) ABSTRACT

A table lamp and rotary joint thereof is disclosed. The table lamp including a base body, a lighting member and a frictional rotary joint connecting the lighting member to the base body is disclosed. The rotary joint includes a housing defining a cavity and a rotary portion defining a rotator. The rotator deforms elastically by means of defining a center hole and a slot extending parallel to the axis of the center hole through the rotator. Compressing the rotator into the cavity, the outer surface of the rotator mates tightly to the inner surface of the cavity. Then the rotator rotates frictionally in the cavity and the lighting member can maintain at a desired angle with respect to the housing.

12 Claims, 4 Drawing Sheets

(56) References Cited

U.S. PATENT DOCUMENTS 5,013,177 A * 5/1991 Sol ................................ 403/235
5,128,841 A * 7/1992 Maglica et al. ............... 362/191
5,499,984 A * 3/1996 Steiner et al. ................... 606/80
5,519,593 A * 5/1996 Hasness ......................... 362/186
6,419,370 B1 * 7/2002 Chen ............................... 362/98
2006/0061991 A1 * 3/2006 Yeh ............................... 362/250

* cited by examiner

TABLE LAMP AND ROTARY JOINT THEREOF

BACKGROUND

1. Technical Field

The present disclosure relates to a table lamp and a rotary joint thereof.

2. Description of Related Art

A rotary joint includes a housing with a cavity and a rotary portion with a rotator received in the cavity. After inserting the rotator into the cavity, the rotator can rotate frictionally in the cavity and maintain at a desired angle with respect to the cavity housing.

However after long time use, the diameter of the cavity increases gradually. The rotator can no longer be maintained at a desired angle with respect to the cavity housing.

What is needed is a rotary joint and a table lamp using the same which can avoid the aforementioned problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
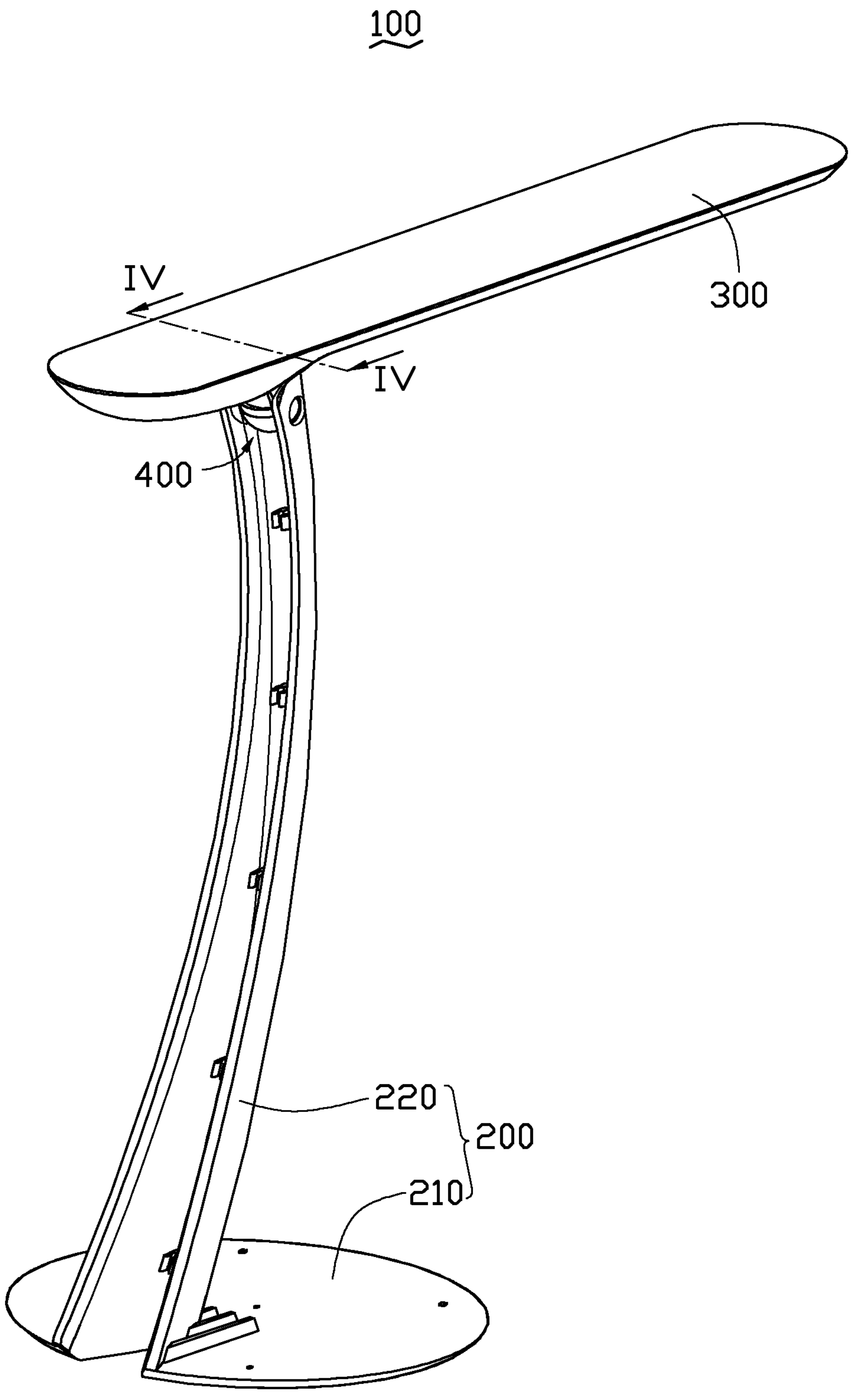
FIG. 1 is an isometric view of a table lamp according to an exemplary embodiment.

Referring to FIG. 1, a table lamp 100 includes a base body 200, a lighting member 300, and a frictional rotary joint 400 connecting the lighting member 300 to the base body 200. The base body 200 includes a base 210 and a support 220 projecting from the base 210. By the rotary joint 400, the lighting member 300, including lighting components, can rotate and maintain a desired angle with respect to the base body 200.

Figure 2:
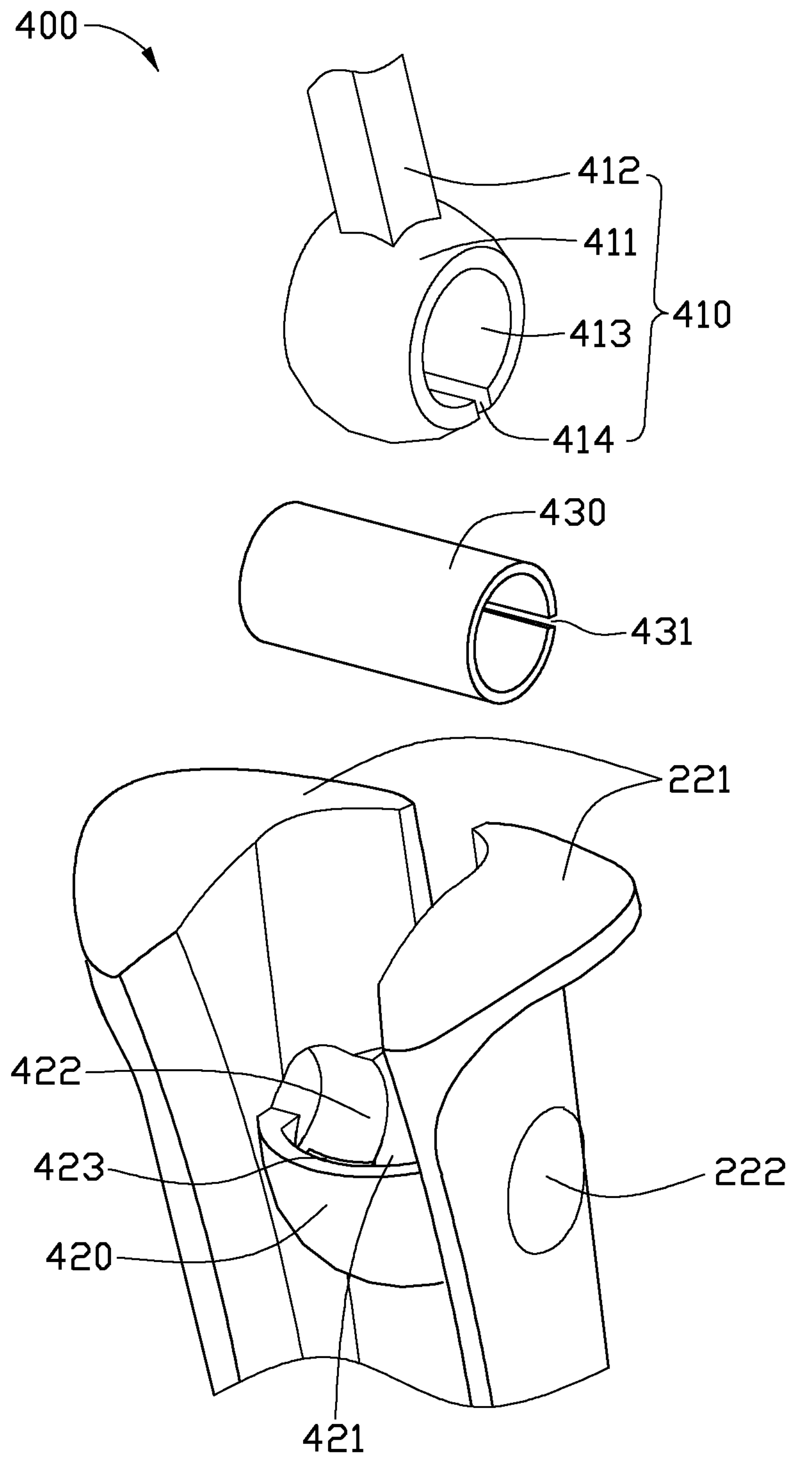
FIG. 2 is an exploded view of a rotary joint of the table lamp of FIG. 1.
Figure 3:
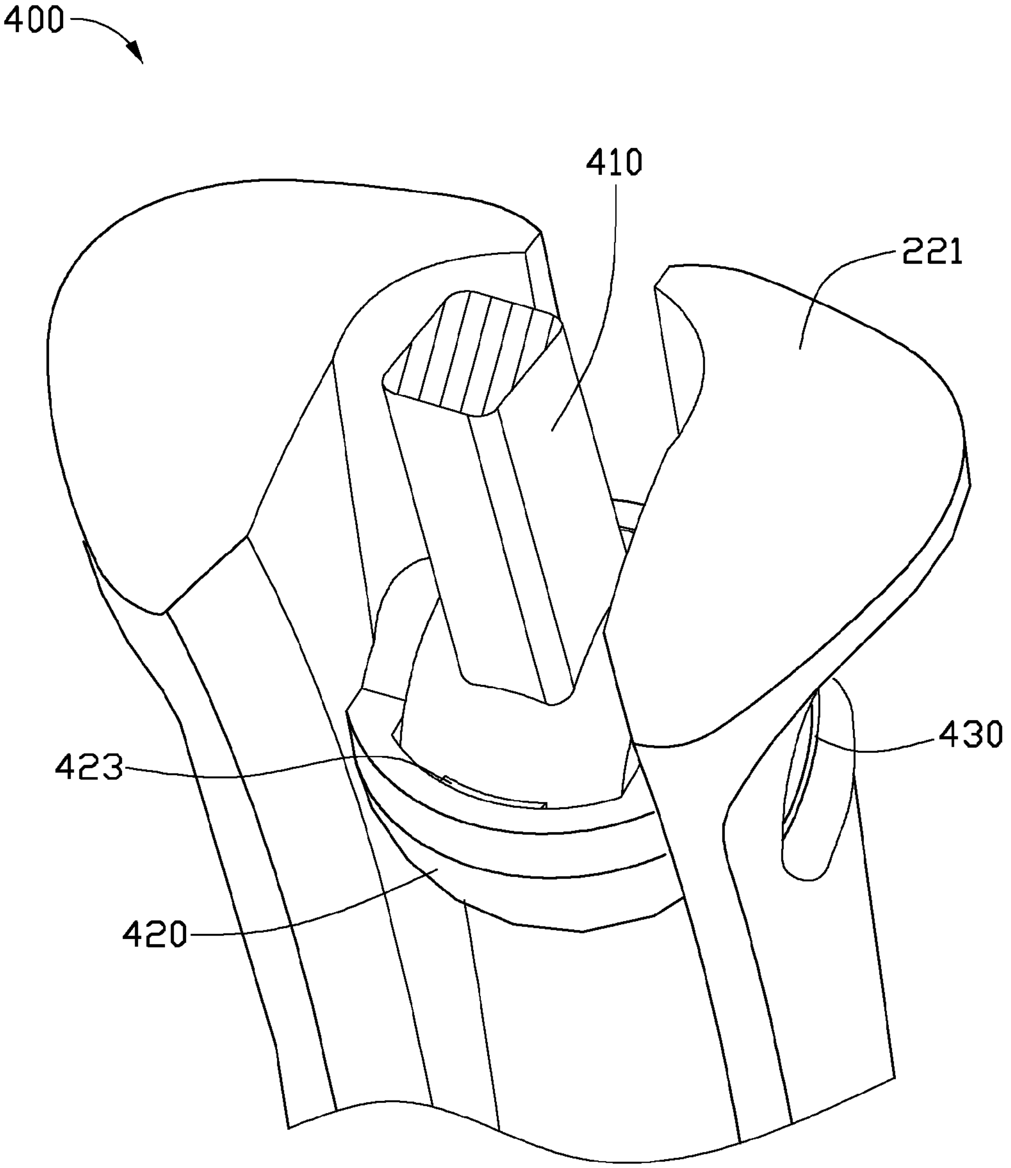
FIG. 3 is an assembled view of the rotary joint of FIG. 2.
Figure 4:
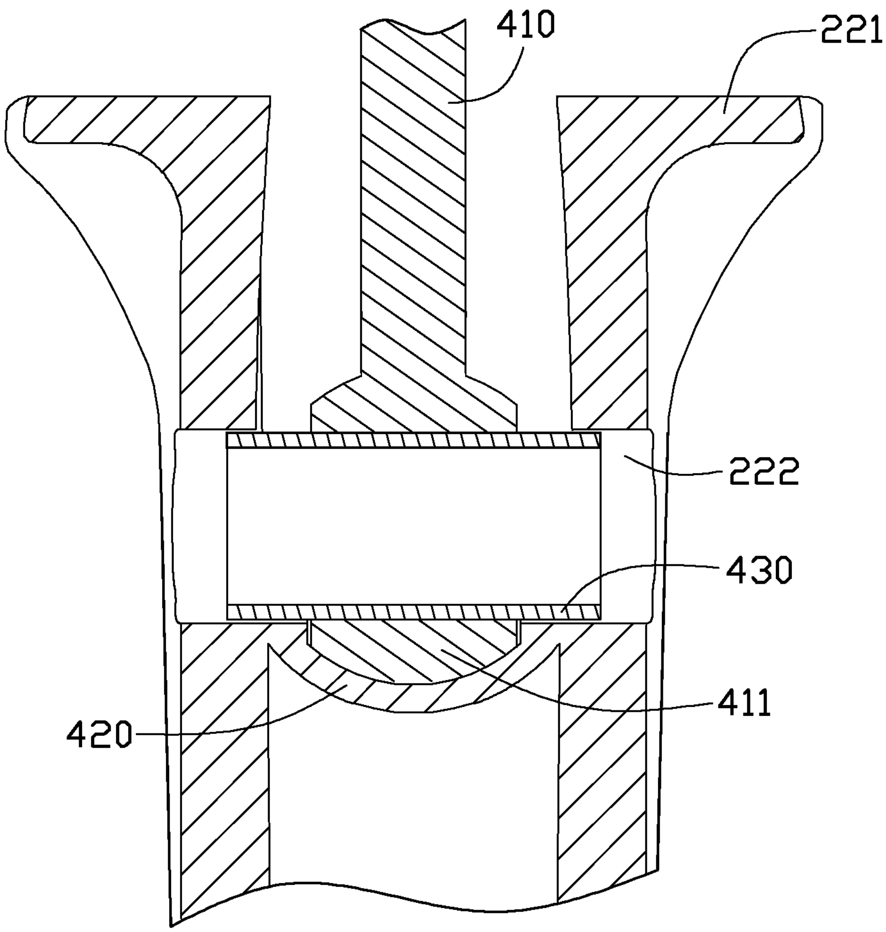
FIG. 4 is a cross-sectional view of the rotary joint, taken along the line IV-IV of FIG. 1.

Referring to FIGS. 2-4, the rotary joint 400 includes a housing 420 and a rotary portion 410. The housing 420 is disposed between two arms 221 of the support 220, and defines a cavity 421 whose surface is substantially spherical. The rotary portion 410 includes a connecting bar 412 fixed to the lighting member 300 and an elastic rotator 411 whose surface is substantially spherical connected to one end of the connecting bar 412.

The rotator 411 defines a center hole 413 and a slot 414 extending parallel to the axis of the center hole 413. The outer diameter of the rotator 411 is slightly greater than the diameter of the cavity 421. In such configuration, after compressing the rotator 411 into the cavity 421, the rotator 411 can rotate in the cavity 421 and mate tightly with the inner surface of the cavity 421 to create friction therebetween to maintain at a desired angle with respect to the housing 410. According to an exemplary embodiment, the cavity 421 and the rotator 411 are drum-shaped.

In another embodiment, the two arms 221 of the support 220 each further define a through hole 222 opposite to each other, and the housing 420 defines two arc holes 422 communicating with the cavity 421 and corresponding to the two through holes 222. The through holes 222 and the arc holes 422 are concentric and communicate with each other. The rotary joint 400 further includes a hollow axle 430 with an axial cut-through slit 431 of which the outer diameter is slightly greater than the diameter of the center hole 413 of the rotary portion 410. After the rotator 411 is inserted into the cavity 421, the hollow axle 430 is also compressed into the center hole 413 through the through holes 222 and arc holes 422, and keeps the rotator 411 to mate with the cavity 421 during rebound. By utilizing the hollow axle 430, the friction can be maintained between the rotator 411 and the cavity 421 even after long time use.

In a further embodiment, a plurality of protrusions 423 are formed around the opening of the cavity 421 to abut the rotator 411, and thus to prevent the rotator 411 from disengaging from the housing 420.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A table lamp comprising: a base body; a lighting member; and a frictional rotary joint configured for rotatably connecting the lighting member to the base body, the rotary joint comprising: a housing, connected to the base body and defining a cavity therein; and a rotary portion comprising an elastic rotator and a connecting bar with opposite ends respectively connected to the lighting member and an outer surface of the elastic rotator, the elastic rotator being rotatably retained within the cavity, wherein the elastic rotator defines a center hole and a slot extending parallel to the axis of the center hole which allows the elastic rotator to deform elastically, an outer diameter of the elastic rotator is greater than a diameter of the cavity; wherein the elastic rotator is compressed and inserted into the cavity, and the outer surface of the elastic rotator mates tightly with an inner surface of the cavity to create friction therebetween, and a hollow axle, wherein the outer diameter of the hollow axle is greater than the diameter of the center hole, and the hollow axle rebounds to apply a pushing force to an inner surface of the center hole after being compressed and inserted into the center hole of the rotator, thereby allowing the outer surface of the elastic rotator to mate more tightly with the inner surface of the cavity.

2. The table lamp of claim 1, wherein the cavity comprises a plurality of protrusions around the opening of the cavity to narrow the open area of the cavity.

3. The table lamp of claim 1, wherein the cavity and the rotator are drum-shaped.

4. The table lamp of claim 1, wherein the hollow axle defines an axial cut-through slit, which allows the hollow axle to rebound after being compressed.

5. The table lamp of claim 1, further comprising two spaced arms projected from the base body, wherein the arms each define a through hole, the housing is disposed between the two arms and defines two arc holes respectively communicating with the cavity and the corresponding through hole, and the axle is inserted into the center hole of the rotator via running through the through hole and the arc hole.

6. The table lamp of claim 5, wherein a length of the axle is greater than a space between the two arms, allowing opposite ends of the axle to be retained in the through holes of the two arms for preventing the rotator from moving out of the cavity.

7. A rotary joint comprising:

a housing defining a cavity therein;

a rotary portion comprising an elastic rotator at an end thereof, the elastic rotator being rotatably retained within the cavity, wherein the elastic rotator defines a center hole and a slot extending parallel to the axis of the center hole which allows the elastic rotator to deform elastically, an outer diameter of the elastic rotator is greater than a diameter of the cavity, and when the elastic rotator is compressed and inserted into the cavity, an outer surface of the elastic rotator mates tightly with an inner surface of the cavity to create friction therebetween; and an elastically deformable hollow axle, wherein an outer diameter of the hollow axle is slightly greater than a diameter of the center hole, and the hollow axle rebounds to apply a pushing force to an inner surface of the center after being compressed and inserted into the center hole of the rotator, thereby allowing the outer surface of the elastic rotator to mate more tightly with the inner surface of the cavity.

8. The rotary joint of claim 7, wherein the cavity comprises a plurality of protrusions around the inner surface of the cavity to narrow the open area of the cavity.

9. The rotary joint of claim 7, wherein the cavity and the rotator is drum-shaped.

10. The rotary joint of claim 7, wherein the hollow axle defines an axial cut-through slit, which allows the axle to rebound after being compressed.

11. The rotary joint of claim 7, further comprising two spaced arms each defining a through hole, wherein the housing is disposed between the two arms and defines two arc hole respectively communicating with the cavity and the corresponding through hole, and the axle is inserted into the center hole of the rotator via running through the through hole and the arc hole.

12. The rotary joint of claim 11, wherein a length of the axle is greater than a space between the two arms, allowing opposite ends of the axle to be retained in the through holes of the two arms for preventing the rotator from moving out of the cavity.

* * * * *